United States Patent [19]
Makram-Ebeid et al.

[11] Patent Number: 5,617,459
[45] Date of Patent: Apr. 1, 1997

[54] METHOD OF PROCESSING IMAGES IN ORDER AUTOMATICALLY TO DETECT KEY POINTS SITUATED ON THE CONTOUR OF AN OBJECT AND DEVICE FOR IMPLEMENTING THIS METHOD

[75] Inventors: Shérif Makram-Ebeid, Dampierre; Jacques Breitenstein, Saint-Maur-des-Fosses, both of France

[73] Assignee: U.S. Philips Corporation, New York, N.Y.

[21] Appl. No.: 500,653

[22] Filed: Jul. 12, 1995

[30] Foreign Application Priority Data

Jul. 12, 1994 [FR] France .................... 94 08652

[51] Int. Cl.$^6$ .................................. G01N 23/04
[52] U.S. Cl. ............................ 378/62; 382/132
[58] Field of Search ...................... 382/128, 131, 382/132, 156; 395/924; 364/413.13; 378/62, 901

[56] References Cited

U.S. PATENT DOCUMENTS

| | | | |
|---|---|---|---|
| 4,101,961 | 7/1978 | Reiber | 364/413.02 |
| 5,065,435 | 11/1991 | Oe | 382/107 |
| 5,457,754 | 10/1995 | Han et al. | 382/128 |

OTHER PUBLICATIONS

"Left Ventricular Contour Detection: A Fully Automated Approach", by PNJ van der Zwet et al, Computers in Cardiology, 1992, IEEE Computer Society Press, pp. 359–362. no month.

"An Algorithm for Locating the Aortic Valve and the Apex in Left–Ventricular Angiocardiograms" IEEE Transactions on Biomedical Engineering, Sep., 1974, vol. BME–21, NR. 5, pp. 345–349. Griffith et al.

*Primary Examiner*—David P. Porta
*Assistant Examiner*—David Vernon Bruce
*Attorney, Agent, or Firm*—Jack D. Slobod

[57] ABSTRACT

A method of processing images in order automatically to detect key pixels ($K_2$, $K_3$, $K_4$) situated on the contour of an object (LV) in an initial image ($I_0$), and a device for implementing this method in which there is storage, in the digitized initial image ($I_0$), of the intensity of the pixels [$A_0(x,y)$] and of data of regions of the object (LV), classes ($C_1$ $C_m$); selection of pixels of interest (PI), on the contour, inside and outside the object (LV); generation of characteristics ($E_1$ $E_k$) for each of the pixels of interest (PI); classification of the pixels of interest (PI) into the classes ($C_1$ $C_m$); and selection of the key pixels ($K_2$, $K_3$, $K_4$) from corresponding classes ($C_2$, $C_3$, $C_4$).

22 Claims, 8 Drawing Sheets

METHOD OF PROCESSING IMAGES IN ORDER AUTOMATICALLY TO DETECT KEY POINTS SITUATED ON THE CONTOUR OF AN OBJECT AND DEVICE FOR IMPLEMENTING THIS METHOD

BACKGROUND OF THE INVENTION

1. Field of Invention

The invention relates to a method of processing images in order automatically to detect key points situated on the contour of an object, referred to as key pixels in an image referred to as the initial image.

The invention also relates to a device for implementing this method.

The invention finds its application in the automatic analysis of a cardiological image of the left ventricle.

2. Description of the Related Art

A cardiological image can favorably be obtained by a system for forming digitized X-ray images.

A cardiological image can also be obtained by means other than X-rays, and the method of processing images according to the invention shall be applicable thereto, since it does not depend on the process by which the image was obtained.

The process used most frequently hitherto to produce a cardiological image consists in injecting a contrast medium towards the left ventricle of a patient, and in recording a sequence of images of this left ventricle, over the duration of effectiveness of the contrast medium. These images, in particular, enable the practitioner to determine the volume of the left ventricle during a ventricular contraction or systole, and the volume of the left ventricle during a ventricular expansion or diastole. A quantity called the ejection fraction is then calculated as the difference between these volumes expressed as a percentage of the maximum volume of diastole. Knowledge of the ejection fraction is an important element in diagnosis by the practitioner. These images also enable the practitioner to determine two key points of the left ventricle, namely the points situated on either side of the aortic valve, which are fixed reference points, and to determine another key point which is the vertex of the left ventricle or apex, the position of which varies between the duration of diastole and the duration of systole. The evaluation of the variation in the distance between the apex and the aortic fixed points, which is called the shortening fraction, is also an important element in diagnosis by the practitioner.

Finally, the determination of the contour of the left ventricle enables the practitioner to detect possible anomalies of shape, and is also an important element in his diagnosis.

An automated approach to the detection of the left ventricle and in particular its contour, within a given image, is known from the prior art through the publication entitled "Left Ventricular Contour Detection": A Fully Automated Approach by PNJ van der ZWET et al. in PROCEEDING COMPUTERS IN CARDIOLOGY, pp. 359–362, Oct. 11–14, 1992, Durham, N.C. U.S.A., in IEEE Computer Society Press, Los Alamos, Calif., U.S.A. This known system uses a combination of algorithms to detect a simplified model of the contour of the left ventricle. The first algorithm, a pyramidal segmentation algorithm, segments the starting image into a fairly large number of regions formed of square boxes of homogeneous intensity. The second algorithm uses a neural network to select the regions which have the greatest likelihood of belonging to the left ventricle. These regions are next merged and then the pixels grouped together as all belonging to the left ventricle are extracted to form the model. After detection of the model, the actual contour is found by dynamic programming. The position of the aortic valve is deduced from the shape of the contour detected.

According to this known method, a pyramid of images consists of a number of images each half the size of the previous image. An image is generated by filtering, with a low-pass filter, the previous image and by sampling at a halved sampling frequency. In this way a stack of image layers can be obtained.

Firstly, the layers of the pyramid are generated by using low-pass Gaussian filters to prevent illegal sampling (or aliasing), and then the resampling of each layer with halved resolution is performed. The image of lowest resolution in the pyramid is a matrix of 16×16 pixels. Each image is segmented by using the segmentation of the previous images of lesser resolution as a guide. The image which has the lowest resolution is segmented by a technique of edge detection. According to the gradient in the low-resolution image, certain pixels are assigned the tag "edge". Groups of pixels which are completely surrounded by the "edge" pixels and which are linked with one another are tagged "isolated region". Finally, all the remaining "edge" pixels are tagged in at least one of the previously found regions, or else, if their grey level differs too much from any other surrounding region, they are allocated a new tag. The result of this segmentation contains a large number of regions consisting of just one pixel, especially in the vicinity of the edges. It is only within the most homogeneous regions of the image, inside the ventricle, the region of the lung or of the diaphragm, that regions of more than one pixel may be found.

Segmentation of the image with the lowest level of resolution is used to obtain segmentation of the images having a higher resolution. Each pixel in the image of highest resolution corresponds to a small number of pixels in the objects of the bottom-most layer. The pixel may only be assigned to one of these objects. A specific pixel is assigned to the most likely object in a statistical sense. It is possible, during the assigning of a tag, for the object to be apportioned to several groups of pixels without correlation in the image of highest resolution. A procedure of retagging subsequent to the assigning retags the apportioned object into a number of tags of different objects.

This procedure continues until the image of highest resolution has been segmented. The segmentation of the image of highest resolution is used in combination with a neural network to obtain the final segmentation.

This neural network is designed for detection of the position of the left ventricle in an image which has been reduced by low-pass filtering and 16×16 sub-sampling. This neural network has three layers. The first layer is the low resolution image which is obtained by low-pass filtering then resampling of the initial ventriculogram. The low-pass filtering is used to prevent illegal sampling (aliasing). The second and third layers each contain 256 neurons. Each of these neurons receives the input of 25 elements of the previous layer through a separate weight for each input. The sigmoid function used to finally calculate the output levels is a continuous function. This enables the neural network to be used as a control module within the model detection algorithm. The pyramidal segmentation algorithm used first results in many different regions, all of which ought to be included within the final left ventricle. Moreover, the resolution of the results from the neural network is too low (16×16) to define the ventricular model properly. Furthermore, the results of the segmentation are sensitive to the value of the threshold, this being required in order to isolate the ventricle from the background.

By combining the results of the two algorithms, better segmentation has been obtained according to this cited document.

For each object tagged in the pyramidal segmentation, a mean value is calculated. The result from the neural network is extended to the resolution of the highest layer in the pyramid. The mean of each object is then calculated by summing the values of the results from the neural network and dividing by the number of pixels in the object. Extensive regions in the ventricle will correspond to points of the neural network with high probabilities. The same is true for the large regions outside the ventricle. It is only on the edges of the ventricle that the pyramidal segmentation consists of a large number of small regions. Their probability of being incorporated will depend on the value of the single neuron with which they correspond. Even if a few errors may be made, assigning to the ventricle an object which ought not to be so assigned, this has no great influence on the model finally detected.

The model is finally obtained by combining all the regions internal to the ventricle, and by extracting the remainder of the image therefrom. At the end of the processing there therefore remain just two classes: the pixels belonging to the ventricle and the pixels not belonging thereto.

Having once found the model, dynamic programming techniques are applied to detect the contour of the left ventricle; these techniques are known to those skilled in the art.

The algorithm taught by the cited publication uses the curves of the contour to determine the position of the aortic valve. To do this it is assumed that the ends of the valve are contour points having a maximum curvature of approximately 90°. In order to avoid choosing other maxima as valve endpoint, the calculation of the angle of the valve endpoints is weighted. For ventriculograms this angle is approximately the same for all patients.

Finally, the valve endpoints and the contour of the ventricle are displayed and the user can correct the contour and retrace the valve. Following which, the dynamic programming techniques are applied just to the corrected parts of the ventricle. When both the contour and the valve endpoints have been determined for the duration of diastole and the duration of systole, and after the user has made corrections, the technical parameters are then calculated.

A drawback of the system described in the cited document is that it uses a very sizeable neural network having a large number of inputs, 256 inputs, and a large number of outputs, 256 outputs, with very rich hidden layers. Hence the weights are difficult to determine and learning requires a very sizeable database.

Moreover, this known system ultimately provides the model only inaccurately, by classifying the pixels into just 2 classes, that of the internal pixels and that of the external pixels, and deduces only the location of 2 key pixels, namely the valve end pixels. The location of the apex is not provided automatically.

Given the ever greater demands of medical techniques, it has been found that the system described in the cited document is not accurate enough nor complete enough and that another solution must be sought.

Nowadays, in a novel approach, those skilled in the an are envisaging a process for achieving analysis of images of the left ventricle involving two main steps:

a first step of locating the three key points formed by the two ends of the aortic valve and by the apex, which step can currently be effected in a sufficiently accurate manner only if it is conducted by hand on a ventriculogram by the practitioner himself, and therefore necessarily entails human interaction, a second step in which the accurate data of the three key points are provided as starting dam, for example manually by an operator, by means of a mouse to a computer, at the same time as the stored data relating to the intensity values linked with each pixel of the original image. The positions of the pixels located on the contour of the left ventricle are then calculated by means of already-known algorithms.

When the data relating to the location of the three key points are provided accurately in the first step, the second step then poses no problem and the result is that the contour of the left ventricle is obtained with all the desired accuracy.

SUMMARY OF THE INVENTION

The present invention is therefore aimed mainly at providing a process for automatic location of the aforesaid three key points:

the two end points of the aortic valve, the vertex of the left ventricle or apex.

Automatic location is understood as determination of the coordinates of these points in the original cardiological image without human intervention, with an accuracy which is as high as or better than if this location were achieved by a human operator.

The advantage which results from this automation is that the processing of the cardiological image can be carried out from beginning to end directly, without human intervention, and can provide a better diagnostic aid to the practitioner, by placing rapidly at his disposal all the important diagnostic elements which were defined earlier.

According to the invention, this purpose is achieved and the advantages are obtained by means of a method of processing images in order automatically to detect points situated on the contour of an object, referred to as key pixels in an image referred to as the initial image, this method comprising a first phase including steps of:

storage in the initial image in the form of a two-dimensional matrix of pixels of the intensity values of each pixel labelled by its coordinates, storage in the initial image of data of regions of the object which are referred to as classes including classes which are referred to as corresponding classes respectively containing the key pixels to be detected;

selection of pixels of the initial image which are referred to as pixels of interest, on the contour, inside and outside the object;

generation of a first vector of characteristics for each of the pixels of interest;

classification of the pixels of interest into said classes of the object on the basis of their respective vector of characteristics.

The advantage of this novel way of classifying the pixels of the image is that those skilled in the art, at the end of this phase, possess much local and contextual information concerning each pixel of interest.

According to the invention, moreover, this method comprises a second phase of selecting the key pixels of the corresponding class, moreover comprising a second phase including a step of:

selection of each of the key pixels from among the pixels of interest of the corresponding class.

The advantage of this method is that it thus makes it possible to detect 3 ,key points, rather than 2 as according to the prior art. Hence, diagnostic aid is speeded up and detection of the contour of the ventricle is subsequently more accurate and can be better automated.

This method is implemented via a device for processing images in order automatically to detect points situated on the contour of an object, referred to as key pixels in an image referred to as the initial image, this device comprising:

first storage means for storing, in the initial image in the form of a two-dimensional matrix of pixels, the intensity values of each pixel labelled by its coordinates, and data of regions of the object, which are referred to as classes, including classes referred to as corresponding classes respectively containing the key pixels to be detected;

means of selection of pixels of the initial image, referred to as pixels of interest, on the contour, inside and outside the object;

first means of calculation, for generating a first vector of characteristics for each of the pixels of interest;

a first neural network for receiving at its inputs the first vector of characteristics and for performing a classification of the pixels of interest into said classes of the object on the basis of their respective vector of characteristics.

Furthermore, this image processing device comprises means of selection of each of the key pixels from among the pixels of interest of the corresponding class.

The advantage of this device is that it is completely automatic.

BRIEF DESCRIPTION OF THE DRAWING

The invention is described below in detail while referring to the following appended schematic figures.

DETAILED DESCRIPTION OF THE PREFERRED EMBODIMENTS

The invention is described below in a non-limiting example of implementation. The dimensions of the images used, the standard deviation of the Gaussian functions, the sampling increments, the number of characteristics chosen to carry through the method described below, etc., can vary according to the particular needs which may appear to those skilled in the art.

The invention can be applied in fields other than cardiography.

Method

Figure 1:
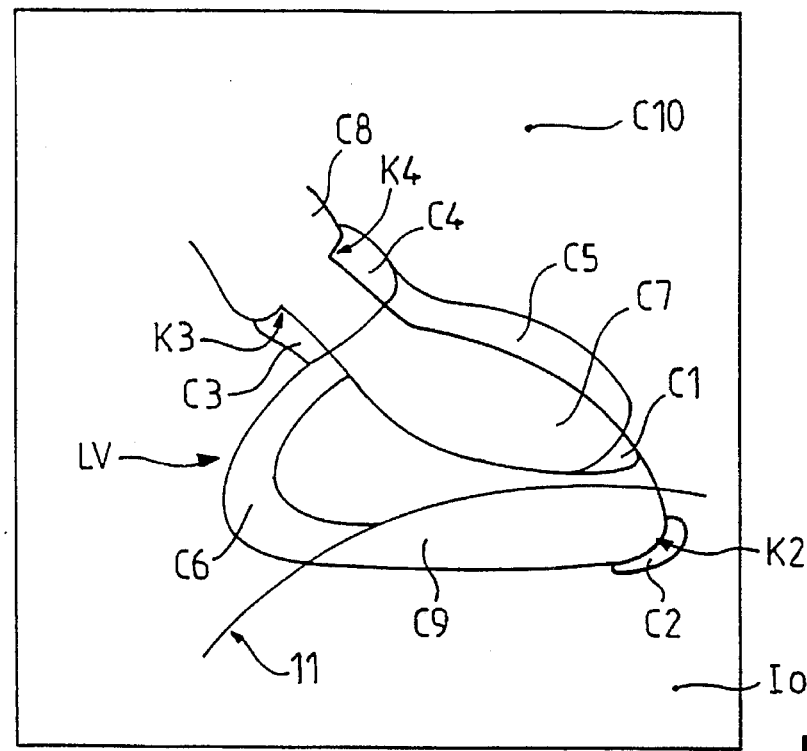
FIG. 1 which represents the left ventricle through 10 different anatomical

Described below, while referring to FIG. 1, is a process for the automatic location of three key pixels K3, K4, K2 in the cardiological image $I_0$ of the .left ventricle LV, or ventriculogram. These key pixels are:

the two ends of the aortic valve, K3, K4;

the vertex of the ventricle or apex, K2, when it is below the diaphragm 11.

Figure 2:
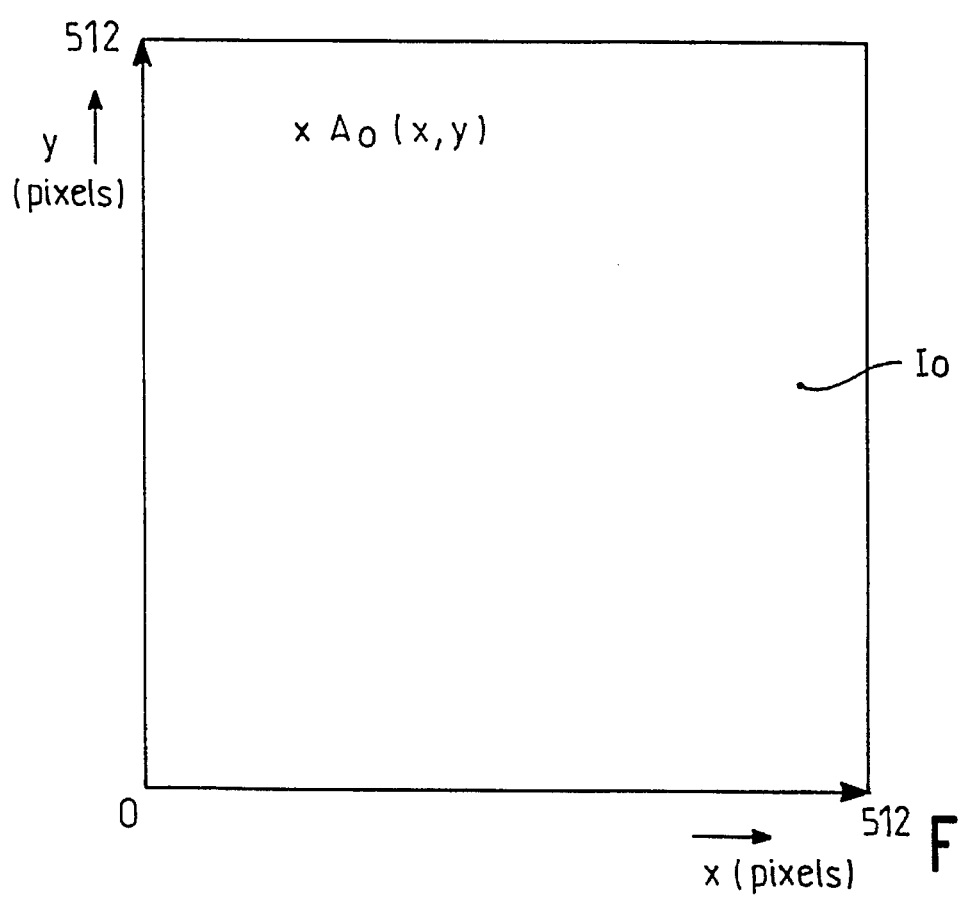
FIG. 2 which represents the original image whose pixels are labelled in a coordinate axis system, FIG. 3A which represents the image of the pixels having maximum gradients, with the exclusion of other pixels of the original image, FIG. 3B which represents the directions in which the gradients are calculated for each pixel, FIG. 3C which illustrates the selecting of the pixel having a maximum gradient in a direction, in order to detect an edge, FIG. 3D which illustrates the selecting of the pixels of interest in the original image, FIG. 3E which represents the image of the selected pixels of interest, FIG. 4A which illustrates the formation of the pyramid of Gaussian images, FIG. 4B which shows the Gaussian function of one of the falters and FIG. 4C which shows the Gaussian function of another filter, these functions having different mid-height widths, FIG. 5A which shows a log-polar transformation chart, FIG. 5B which illustrates the calculation of the intensity averages of the pixels in the circular sectors of the log-polar chart, FIG. 1.

Referring to FIG. 2, the ventriculogram is a digitized image $I_0$ of the left ventricle LV, in which each current pixel $A_0(x,y)$ is characterized by its coordinates x, y in two coordinate axes relating to the image, and by its intensity. This intensity is, in the example described below, coded into grey levels, for example from 0 to 255, the greatest intensity corresponding to the highest level, that is to say to the lightest pixels.

Moreover, in the example described below while referring to FIG. 2, the original digitized image $I_0$ is formed of 512×512 pixels, that is to say 512 pixels along the x axis and 512 pixels along the y axis. This is the image with the greatest resolution in this case.

The process for locating these three key pixels in the digitized cardiological image of the left ventricle essentially comprises two phases:

I/FIRST PHASE: Classification into a number of anatomical regions.

In this first phase, the current pixels $A_0(x,y)$ are classified into a certain number m of classes, numbered C1, C2 . . . Cm, corresponding to specific anatomical regions of the left ventricle.

TABLE I

| N° of class C | Description of the class |
|---|---|
| 1 | Apex projected above the diaphragm |
| 2 | Apex projected below the diaphragm |
| 3 | Posterior end of the valve of the aorta |
| 4 | Anterior end of the valve of the aorta |
| 5 | Anterior edge of the left ventricle |
| 6 | Posterior edge of the left ventricle |
| 7 | Pixels internal to the left ventricle |
| 8 | Pixels internal to the aorta |
| 9 | Pixels internal to the ventricle and below the diaphragm |
| 10 | Pixels external to the ventricle |

In this first phase while referring to Table I and FIG. 1, the pixels $A_0(x,y)$ of the original image Io are preferably classified, for example, into a number m=10 classes. Some classes, such as class C7 which relates to the pixels internal to the left ventricle, or class C10 which relates to the pixels external to the left ventricle, are classes which comprise within the 512×512 original image $I_0$, a large number of pixels having fairly homogeneous intensities. Contrastingly, classes C1 and C2 which relate to the apex, or classes C5 and C6 which relate to the anterior and posterior edges of the ventricle, are classes which comprise various pixels whose intensity varies rapidly from one pixel to its neighbor.

It was found that in order to determine the coordinates of each of the 3 key pixels K2, K3, K4, it was necessary, in a first stage, to locate each pixel $A_0(x,y)$ of the original image $I_0$ with respect to an anatomical region Ci (i is a class number lying between 1 and m) of the left ventricle, as it was apparent that these 3 key pixels could not be accurately located using only local information, for example relying only upon the variation in intensity near the apex, or upon the variation in curvature at the ends of the aortic valve as is done in the prior art.

It was found that it was necessary to take account both of the local information—since each of the 3 key pixels is on the contour of the left ventricle and since the information varies rapidly in the contour regions—, and contextual information—since each of the 3 key pixels has a very precise position relative to the other anatomical regions of the left ventricle.

This first phase comprises:

Ia) FIRST STEP: Determination of pixels of interest PI.

In this step, the 512×512 starting image is sub-sampled into a 64×64 image; this is however carried out in such a way as to preserve within this sub-sampled image the pixels of the contour of the left ventricle.

The purpose of this first step is to decrease the number of pixels to be processed so as to decrease the calculation time. However, in this sub-sampling it is not permissible to eliminate the left ventricle contour pixels since the 3 key pixels to be located can lie only on this contour. At the same time as the original image is sub-sampled, the left ventricle contour pixels must be preserved: this sub-sampled image then contains all the pixels of interest PI.

This sub-sampling step is conducted by means of the following sub-steps:

Ia1) FIRST SUB-STEP: Formation of the "image I(GM) of the gradients with elimination of the non-maximal gradients".

Figure 3A:
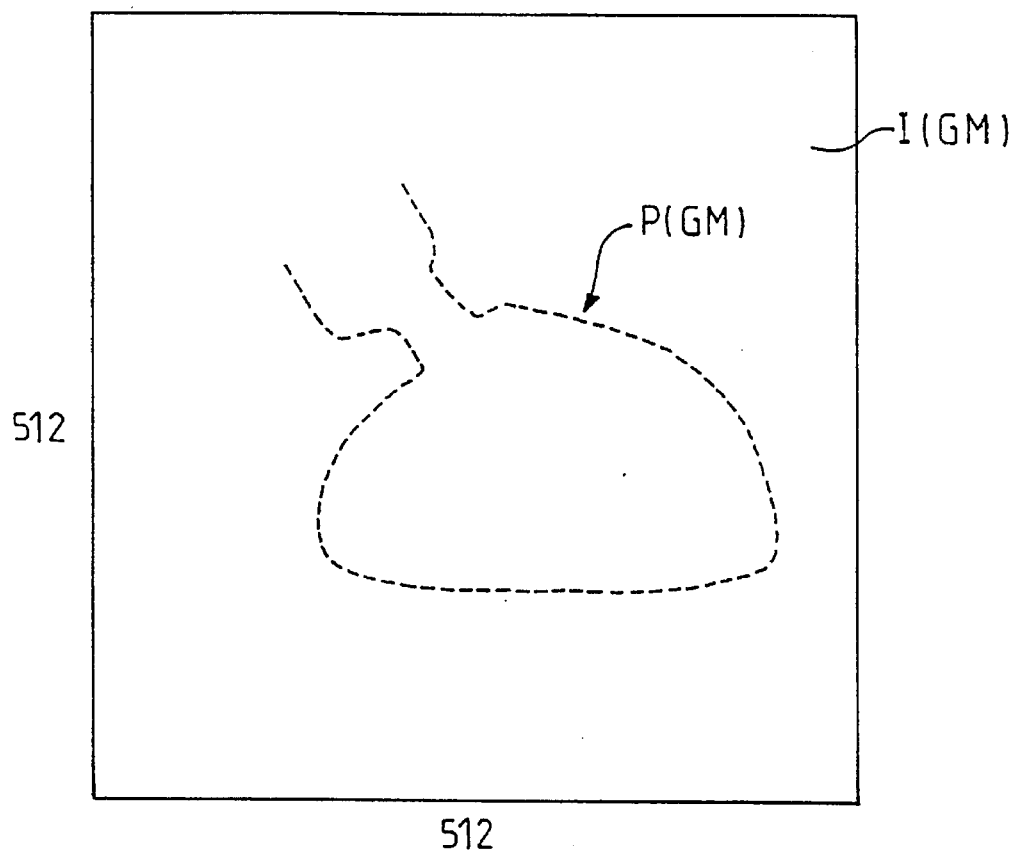

Referring to FIG. 3A, this first sub-step allows the detection of the left ventricle contour pixels P(GM) by a technique of edge detection.

The gradient of intensity G is calculated at each pixel $A_0(x,y)$ of the original image $I_0$. Only the pixels P(GM) where the gradient of intensity is a maximum are retained as pixels of this "image of gradients" I(GM). The gradient of intensity at each pixel is obtained by passing a "gradient filter", known to those skilled in the art, over the original image, which calculates the derivative of the intensity in the x axis direction, forming the first component of the gradient vector, the derivative of the intensity in the y direction forming the second component of the gradient vector and the modulus of the gradient vector.

Figure 3B:
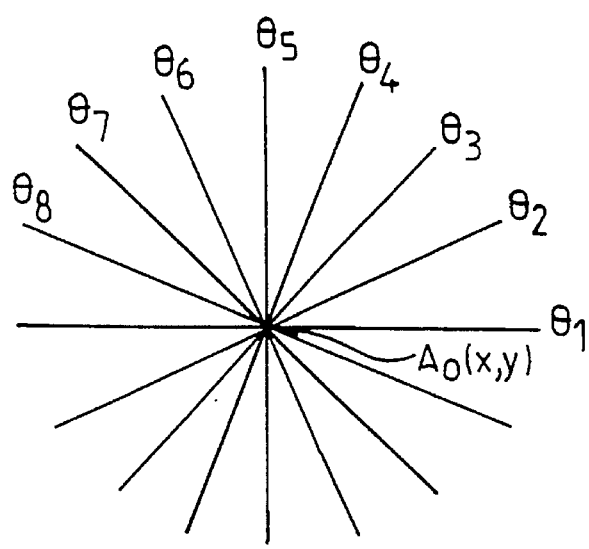

Referring to FIG. 3B this operation is repeated, regularly turning the filter by an angle $\pi/8$ for example; that is to say calculation of the gradient is performed in 8 orientations $\Theta_1$ t to $\Theta_8$ in space around each pixel $A_0(x,y)$. The local direction in which the gradient is a maximum is then identified and stored.

Figure 3C:
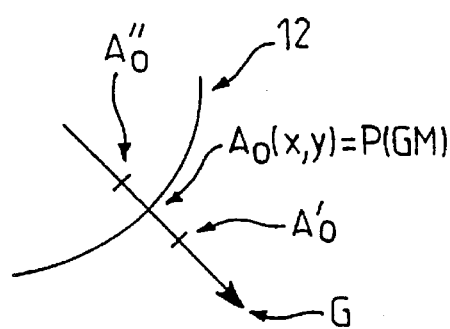

Referring to FIG. 3C, in this direction of maximum gradient, and within a small neighborhood, for example within 3 pixels including the current pixel $A_0$ and the two pixels $A'_0$ and $A''_0$ situated on either side of this current pixel in this direction, only the pixel P(GM) whose gradient is a maximum is retained. In FIG. 3C, the pixel P(GM) is illustrated as coinciding with $A_0$.

The values of the intensities of the pixels whose gradients are not maximal are set to zero. "The image of the gradients" I(GM) therefore ultimately contains only the pixels P(GM) whose gradients are a maximum, as shown in FIG. 3A.

The formation of this "image of gradients with elimination of the non-maximal gradients" is a "technique of edge detection". By applying this technique to the 512×512 original image, an image is obtained all of whose pixels are eliminated with respect to this original image, except the pixels situated on the contour of the left ventricle, as well as a number of pixels situated on spurious edges.

The coordinates and the intensities of these pixels P(GM) of the "image of gradients" I(GM) are stored. The local directions of the maximal gradients are also held in memory.

Ia2) SECOND SUB-STEP: Formation of the image of pixels of interest I(PI).

Figure 3D:
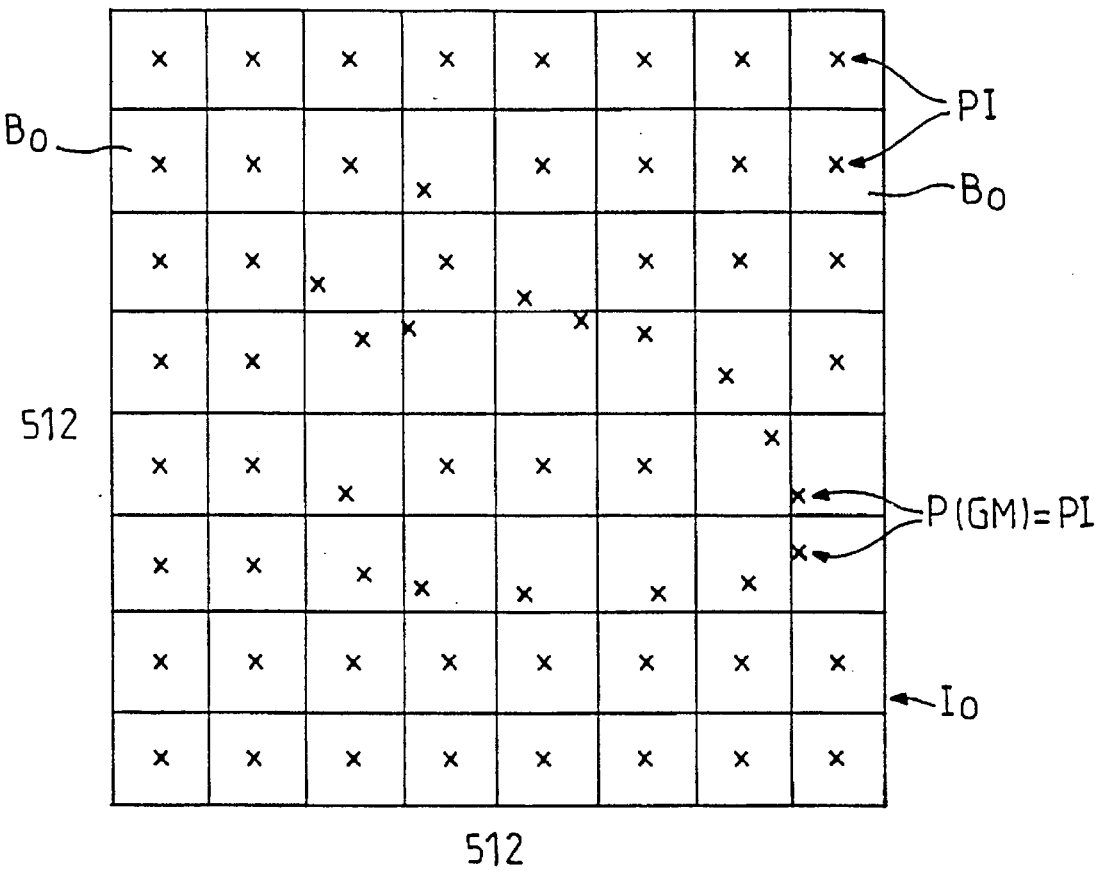
Figure 3E:
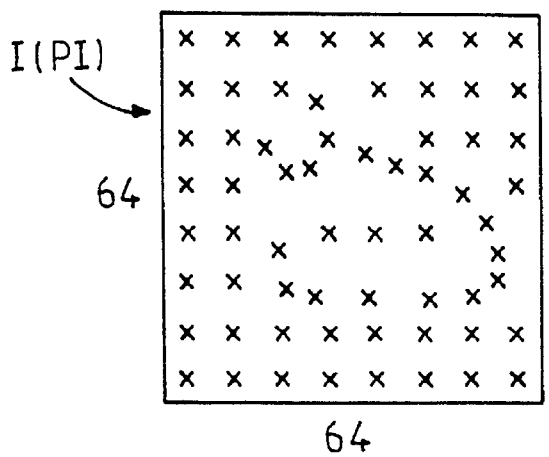

Referring to FIGS. 3D and 3E, it is desired to obtain, starting from the original image $I_0$, a 64×64 sub-sampled image containing only the pixels of interest PI, termed the "image of pixels of interest I(PI)". For this purpose, the original image $I_0$, 512×512, is divided into boxes $B_0$, for example containing 8×8 pixels, and just 1 pixel per box is selected as pixel of interest PI.

Referring to FIG. 3D, the selection of the pixels of interest PI is performed by combining the information contained in the original image $I_0$ and the information contained in the "image of gradients with elimination of the non-maximal gradients" I(GM).

Each current box $B_0$ is examined:

- if in this box the "image of gradients" I(GM) contains only pixels whose intensity has been set to zero, that is to say contains no pixel whose gradient is a maximum, then that pixel of the 512×512 image which is positioned at the center of the box is selected: this pixel becomes a pixel of interest PI,
- if in the box, the "image of gradients" I(GM) contains a pixel P(GM), this pixel is selected as being a pixel of interest PI,
- if in the box, the "image of gradients" I(GM) contains several pixels P(GM), a single pixel is selected: that one having the largest gradient among the maximal gradients is retained in order to constitute a pixel of interest PI.

Referring to FIG. 3E, the intensity and the coordinates of all the selected pixels PI are stored. These selected pixels of interest PI form a 64×64 sub-sampled image termed the pixels of interest image I(PI). These pixels of interest H are regularly distributed over this image in areas where the ventriculogram $I_0$ contains no edges, and they are on the edges in the areas where these edges exist in the ventriculogram.

The first phase furthermore comprises:

Ib) SECOND STEP: Generation of a vector of E1 to $E_k$ characteristics for each pixel of interest.

In this second step, one imagelet Ij(PI) is constructed per pixel of interest PI, i.e. 64×64=4,096 imagelets in total (with j=1 to 4,096) which each contain between 100 and 256 items of information relating to one of the pixels of interest, including local information, that is to say relating to a small neighborhood of the pixel of interest PI, and contextual information, that is to say relating to regions far from the pixel of interest PI.

These items of information can also be referred to as forming a vector of characteristics allocated to each pixel of interest PI.

Several processes are possible in order to unite this local and contextual information. Two processes will be described below.

The first process described is based on a log-polar transformation; the second described is based on a process of filtering in order to calculate differential operators. Each of the processes is applied to a number of sub-sampled images having undergone low-pass filtering so as to limit as far as possible the calculation time required for their implementation.

Ib1) PRELIMINARY SUB-STEP: Multi resolution filtering to form a pyramid of Gaussian images $I_0$ to $I_7$.

Figure 4A:
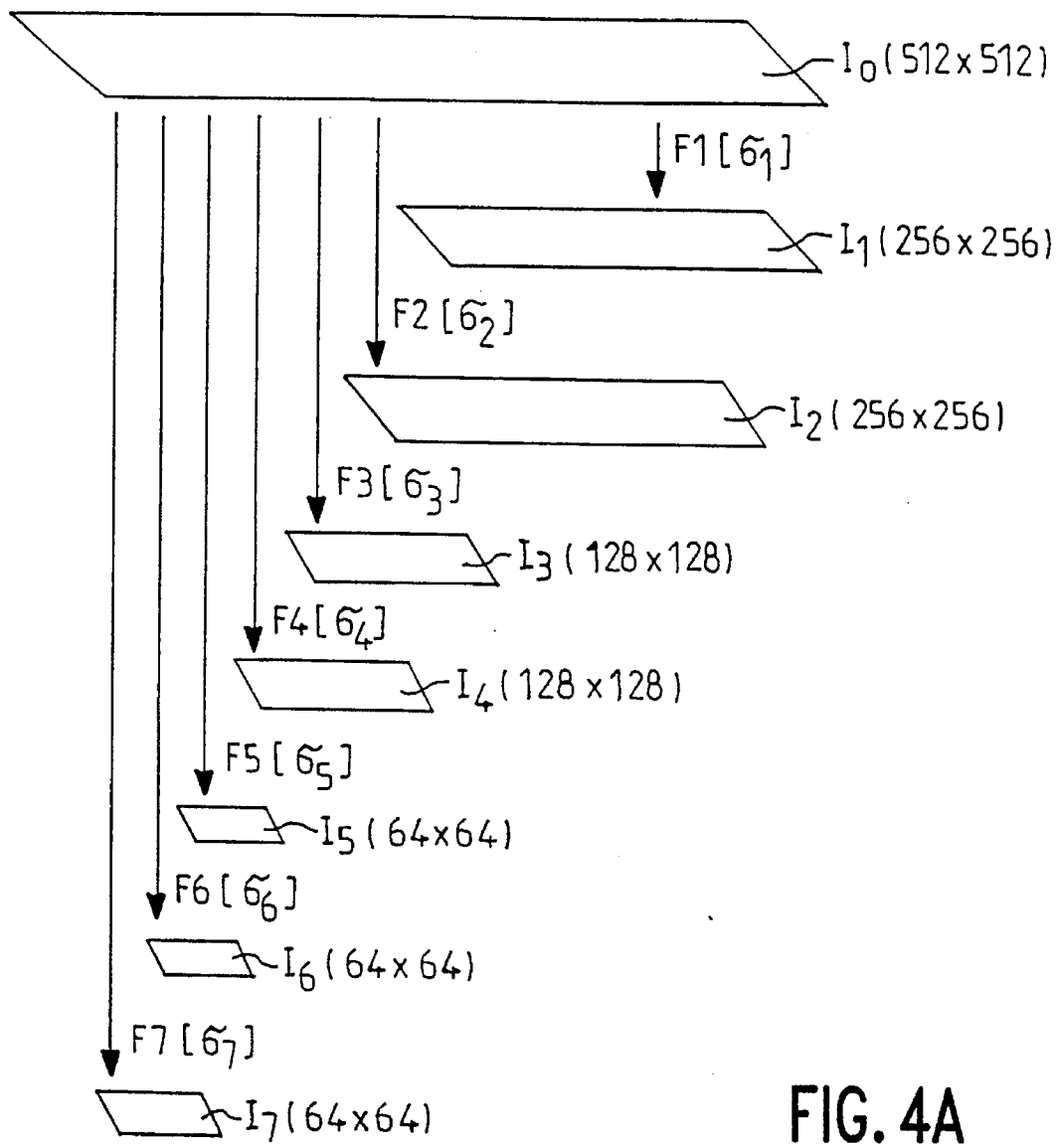
Figure 4B:
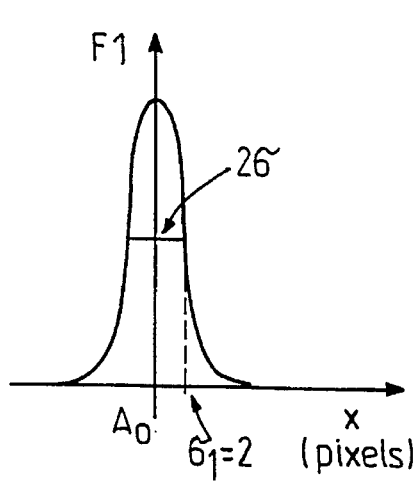
Figure 4C:
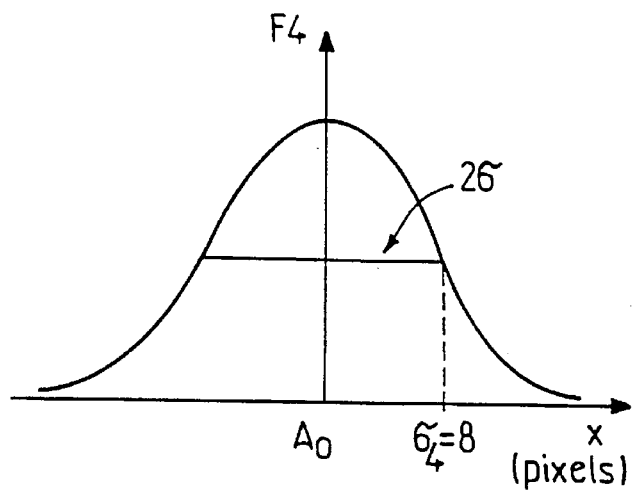

For this purpose, referring to FIG. 4A, 4B, 4C, the 512×512 image $I_0$ is subjected to a low-pass filter F1 whose kernel is an isotropic Gaussian function whose standard deviation (the mid-height width) $\sigma_1$ determines the resolution of the image obtained by filtering. Through such filtering, the details of the image $I_0$ are smoothed. A Gaussian function having $\sigma_1=2$ pixels can for example be used for this first filtering. Subsequently, the image $I_0$ is sub-sampled, adopting for example a halved sampling frequency, that is to say a sampling increment D equal to 2 pixels; and a 256×256 image is thus formed.

Referring to FIG. 4A, by successive filterings F1 and F7 by means of filters whose kernels are isotropic Gaussian functions with larger and larger $\sigma$ values, $\sigma_1$ to $\sigma_7$, and adopting an appropriate sampling increment, smaller and smaller sub-sampled images are obtained whilst avoiding the problems of illegal sampling (aliasing). These images can be obtained with various resolutions dependent on the chosen $\sigma$.

Thus, 7 sub-sampled images can be formed with various resolutions.

For example, starting from the 512×512 image $I_0$ with

F1 having $\sigma_1=2$ and D=2, we obtain $I_1$ at 256×256

F2 having $\sigma_2=3$ and D=2, we obtain $I_2$ at 256×256

F3 having $\sigma_3=5$ and D=4, we obtain $I_3$ at 128×128

F4 having $\sigma_4=8$ and D=4, we obtain $I_4$ at 128×128

F5 having $\sigma_5=12$ and D=8, we obtain $I_5$ at 64×64

F6 having $\sigma_6=16$ and D=8, we obtain $I_6$ at 64×64

F7 having $\sigma_7=20$ and D=8, we obtain $I_7$ at 64×64 where the kernels of the various filters from F1 to F7 are the Gaussian functions. This step is termed the multiresolution filtering step, and the various images formed respectively by the filters F1 to F7 are denoted $I_1$, to $I_7$ and form, together with $I_0$ the original image, a pyramid of Gaussian images.

Ib2) FIRST PROPOSED PROCESS: Log-polar transformation

Figure 5A:
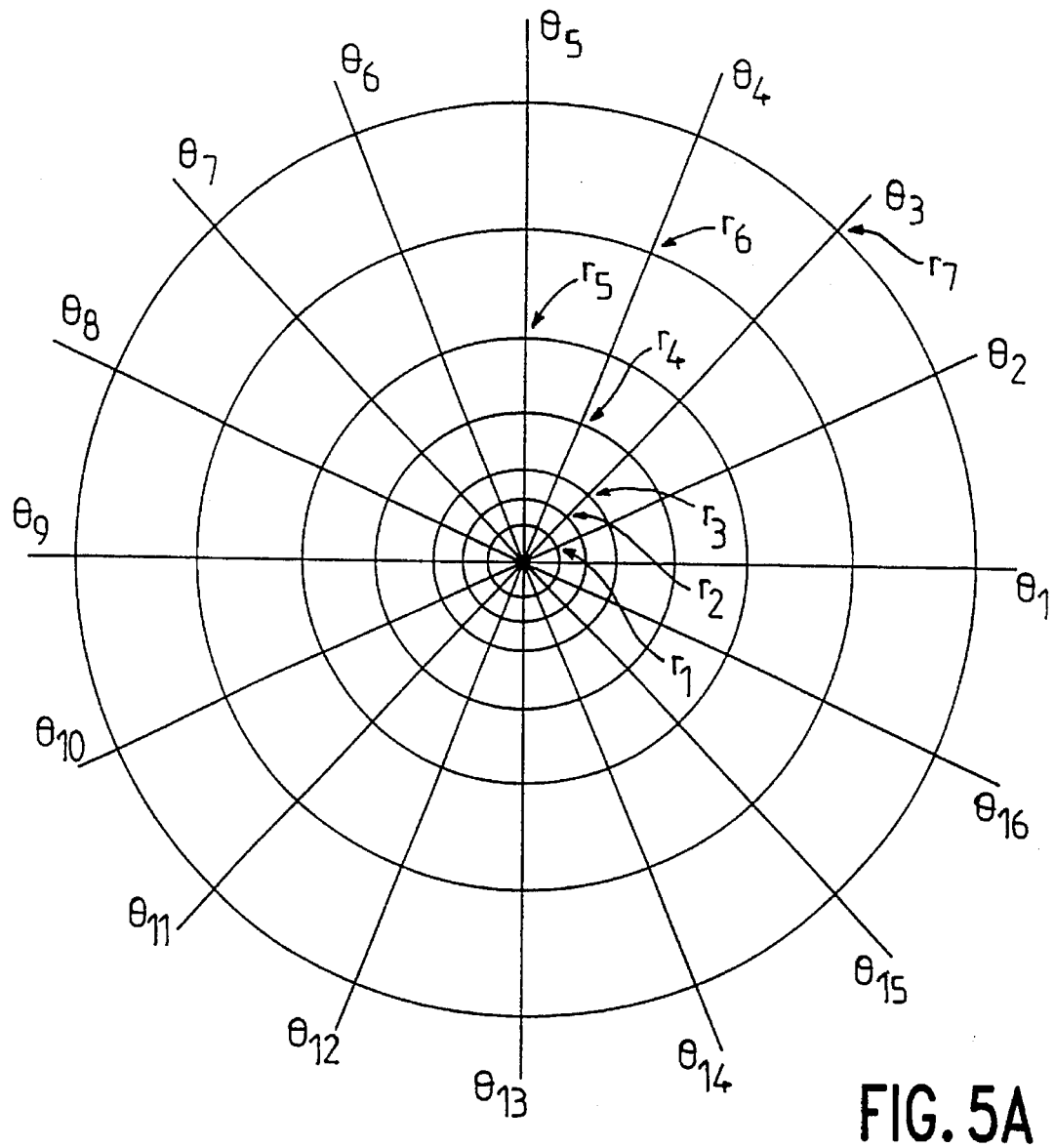
Figure 5B:
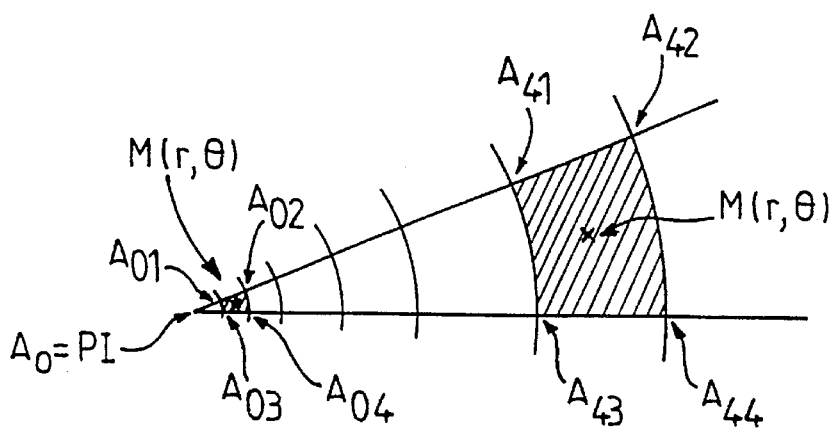

Referring to FIG. 5A and 5B, the log-polar transformation process is a process of image processing having analogies with the physiology of vision in humans, which is capable of juxtaposing local and contextual information.

The log-polar process draws on this physiology which teaches that the center of the retina of the human eye contains many more photodetectors than the surroundings. The center of the retina is called the "fovea" (from the Latin meaning depression). The fovea is the spot in the retina with the largest concentration of rods and cones, these photoreceptors becoming more and more rare on proceeding away from this center.

In the same way, points of the image $I_0$ are selected very densely around a current pixel $A_0(x,y)$, and on receding from this pixel, pixels are selected further and further apart on radii deviating at angles distributed between 0 and 360°.

This log-polar process is based on a chart represented in FIG. 5A with the aid of which 16 axes regularly spaced apart by an angle $\Theta=2\pi/16$, labelled $\Theta_1$ to $\Theta_{16}$, are determined starting from a center, which in this instance will here be the pixel of interest PI repositioned by virtue of its coordinates at $A_0$ in the original image $I_0$, or possibly in one of the images of the pyramid of Gaussian images, and lengths, or radii, are determined on these axes starting from the center: r1, r2, r3 . . . etc. These radii are in geometrical progression such that:

$$r_n = p(r_{n-1})$$

where n is an integer from 0 to 16 inclusive and where p is a real number less than 1.

The radii r1, r2 . . . and the angles $\Theta_1$, $\Theta_2$ . . . thus determine, around each pixel of interest PI, circular sectors whose areas increase on receding from the center.

Referring to FIG. 5B, all the pixels situated in the circular sectors are considered, and the mean of their intensity in each sector is calculated. The pixels situated in the circular sectors are searched for within the various images of the pyramid of Gaussians, as explained below.

When the circular sector is delimited by two radii of large value, the area of this sector is large and the mean would be calculated over a large number of pixels if the image considered for this calculation were the image with full resolution $I_0$. Hence, the information provided by this circular sector is global or contextual, that is to say it relates to a region far from the pixel of interest PI and at the same time relates to a region of large When the circular sector is delimited by two radii of small value, however, the mean is calculated over a small number of pixels, hence the information is local, that is to say it relates to a region not far from the pixel of interest and of small area.

The mean of the intensities in each circular sector is calculated with the help of the images $I_0$ to $I_7$ determined earlier. For this purpose, that image is sought whose resolution is such that 4 of its neighboring pixels coincide with the four pixels which delimit the circular sector: in this case the mean to be taken corresponds to the calculation, by interpolation, of the intensity of a point M situated at the center of the square delimited by the 4 pixels of the sub-sampled image. Next, the intensity of this point M, calculated through this interpolation, as well as coordinates of this point in r and $\Theta$, are stored.

Referring to FIG. 5B, it is therefore apparent that, by virtue of this process, when seeking to average the intensities in an angular sector delimited by small radii having for example 4 corner pixels $A_{01}$, $A_{02}$, $A_{03}$, $A_{04}$, the 4 pixels required for the interpolation will be sought within a weakly sub-sampled image which is at the same time an image of high resolution, for example the image $I_0$ or else an image $I_1$ or $I_2$. The larger the radii, delimiting a circular sector having for example 4 corner pixels $A_{41}$, $A_{42}$, $A_{43}$, $A_{44}$, the more there will be cause to seek the 4 pixels required for the interpolation within a strongly sub-sampled image which is at the same rime an image with low resolution, for example $I_3$ to $I_7$.

From a practical viewpoint, the strongly sub-sampled images are images in which the pixels which have been retained by applying the sampling increment D to a previous less sub-sampled image, have been crammed together so that these sub-sampled images are smaller and smaller with respect to the original image $I_0$.

For the calculations of the mean of the intensities of a given circular sector, and hence in order to make the pixels delimiting this sector coincide with the pixels of a sub-sampled image, the radii r1, r2 . . . of the circular sector must first be divided by a number which takes into account the sampling increments used to arrive at the sub-sampled image which will be used to perform the interpolation.

When the interpolation is carried out between the 4 pixels found in the sub-sampled image, all of the sought-after information is obtained since successive filterings imply that the most sub-sampled images are also the smoothest, or, as expressed by those skilled in the art: averaged. Thus, local information is indeed obtained close to the pixel of interest PI in the circular sectors of small radii, and global information remote therefrom, in circular sectors of large radii.

By this process of log-polar transformation, each of the 4,096 selected pixels of interest PI is furnished with a number k of 256 characteristics which are the 256 intensities found in the pixels $M(r,\Theta)$ by interpolation, at the 16 radii and 16 angles chosen (hence k=256).

These 256 characteristics form, for each pixel PI, a "vector of 256 characteristics". These characteristics can also be regarded as forming an imagelet Ij, (with j=1 to 4,096), i.e. 4,096 imagelets in all, corresponding to the 4,096 pixels of interest, having pixels M identified by a radius r and an angle $\Theta$, and endowed with an intensity calculated by the interpolation described earlier.

With the aim of reducing the amount of information without reducing the quality of the sought-after result, which in this phase is the determination of 10 anatomical classes C1 to C10 in the cardiological image, and ultimately the determination of the 3 key pixels, the second process disclosed below may be chosen as an alternative.

Ib3) SECOND PROPOSED PROCESS: Recursive faltering in order to apply differential operators.

This process includes the implementation of a bank of filters, the number k of which is only of the order of or slightly greater than 100 (hence k≈100).

These filters comprise a first bank of orientable recursive filters and a number of special filters.

* ORIENTABLE RECURSIVE FILTERS

In the previous step of multiresolution filtering in which the original image $I_0$ was sub-sampled and low-pass filtered, a number of images $I_0$ to $I_7$ with different resolutions were obtained forming the pyramid of Gaussian images. These images exhibit smoother and smoother grey levels as the resolution becomes coarser and coarser, that is to say grey levels which vary more and more slowly.

After this multiresolution filtering step, a series of calculations is performed which consists:

in placing the pixels of interest PI in each of the images of the pyramid of Gaussians and in evaluating their intensity;

in evaluating numerically the derivatives up to order 4, at each of these pixels of interest, in each resulting image $I_0$ to $I_7$, by means of orientable filters known by the name of SOBEL filters.

These calculations provide, for each pixel of interest PI, and for each of the images of the pyramid of Gaussians:

to order 0:
the convolution function of the Gaussian function with the intensity which constitutes the mean value of the intensity at the current pixel to order 1:
the first derivative along the x axis, and the first derivative along the y axis, of the function to order 0 which constitute the gradient of intensity,
the second derivative along the x axis, and the second derivative along the y axis, of the function to order 0,
the mixed derivative in xy, of this function to order 0.

And similarly all the derivatives in x and in y and the mixed derivatives are calculated to order 3 and to order 4. These values constitute a bounded expansion constructed by taking a linear combination of the successive derivatives of the convolution functions or smoothed images.

Each of the terms of the polynomial consisting of the derivatives to orders 0 to 4 highlight a characteristic detail of the image to which they are applied.

In all 15 filters are required to calculate all the elements of the polynomial from order 0 to order 4. And these calculations can be carried out for the 7 images $I_0$ to $I_7$ with different resolutions defined earlier. As a result, 105 filters are required to perform these calculations.

In other words, for each pixel of interest PI, one set of characteristics is drawn from the high-resolution image, another set of characteristics from the image of lower resolution, and yet another set of characteristics from the image of still lower resolution, etc.

The response of each of the filters constitutes 1 characteristic. This characteristic is allocated only to each pixel of interest PI. Hence, in all, 105 characteristics may be calculated for each of the 4,096 pixels of interest PI.

The number of characteristics may be decreased by applying a limited number of filters to the images of lower resolution out of the 7 resolutions. Thus, instead of applying 15 filters to these low-resolution images, it is sufficient to apply only the filters providing the calculations to order 0, 1 and 2 for the medium resolutions, that is 7 filters; then only the filters providing the calculations to order 0 and 1 for the very low resolutions, that is 3 filters.

The original image is thus finally characterized very correctly by using merely a bank of around 80 filters applied and distributed, as defined above, to the 7 images having various resolutions.

In all 80 characteristics can be assigned to each selected pixel of interest PI.

* SPECIAL FILTERS

To these first 80 characteristics can be added characteristics which are more typical of the particular problem which it is wished to process: this particular problem relates to the case of the left ventricle. For example, these added characteristics can be:

the modulus of the gradient at one of the resolutions which has been chosen, the direction of this gradient.

For this purpose, when constructing the "image of gradients with elimination of the non-maximal" I(GM), the two components of the gradient vector, in the x direction and in the y direction, were calculated. Its modulus was deduced therefrom. In addition, in order to determine the pixels with maximum gradients, the direction of these maximum gradients was calculated out of 8 directions. This information was stored. Such information can constitute additional characteristics.

The direction of the gradient is in fact of particular interest when it is known that the direction of the gradient of each of the 3 key pixels which it is sought ultimately to locate, is a constant in all the ventriculograms, for all patients.

the local curvature of the lines of equal grey level.

Another interesting characteristic can also be evaluated, namely the local curvature of the lines of equal grey level which pass through a current pixel $A_0(x,y)$.

The previously described bank of SOBEL filters already provides the first derivatives in the x and y directions, the second derivatives in these two directions, and the mixed derivatives of the convolution function. Thereafter, mathematical formulae, known to those skilled in the art, exist for calculating the local curvature of a line of equal grey level. This calculation is performed by using several filters with various resolutions. The local curvature of the lines of equal grey level make it possible to ascertain, among other things, the local curvature of the contour of the left ventricle.

On completion of these recursive filterings forming differential operators, a vector has been generated with around 100 to 125 characteristics per pixel of interest. As has been seen, by limiting the number of filters as a function of the resolution of the images of the pyramid of Gaussian images to which they are applied, it is possible to make do with 100 filters generating, therefore, a vector of 100 characteristics per pixel of interest PI. It may also be stated that 4,096 imagelets Ij(PI) have been formed, consisting of these k characteristics (hence here k=100).

An image has thus been coded in a way which is compatible with the inputs of a neural network; this coding will allow the introduction of all the information telling the neural network how the intensity, at the given resolution, varies as a function of the x and y axes. This coding is adapted to the neural network in such a way that it is able to classify the pixels of interest PI into one of the 10 classes C1 to C10 in an effective manner. This information is sufficient to construct, for each pixel of interest PI, an image of probability of belonging to one of the 10 classes defined in Table I.

Ic) THIRD STEP: Use of a first neural network.

When the vector of k characteristics has been defined for each of the 4,096 pixels of interest PI of the 64×64 image, I(PI), this vector is presented to the input of a first neural network denoted NN1, having an equal number k of inputs denoted $E_1^1$ to $E_k^1$, a single hidden layer and a number m of outputs equal to that of the anatomical classes, namely here 10 outputs denoted C1 to C10.

Figure 6A:
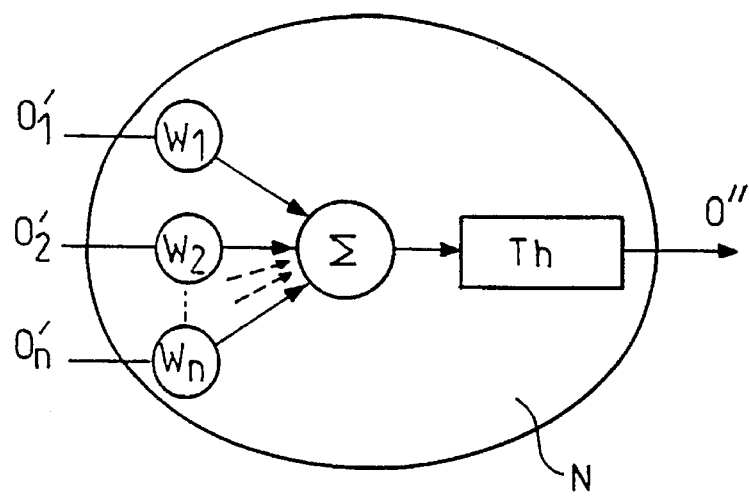
FIG. 6A which shows a neuron.

Referring to FIG. 6A, a neural network is composed of several calculating elements called neurons N disposed in layers. Each element or neuron N provides an output 0" and can receive one or more inputs $0'_1$, $0'_2$, etc. The output is activated when the sum $\Sigma$ of the inputs weighted by weights W1, W2, etc. . . . exceeds a certain threshold function Th.

Figure 6B:
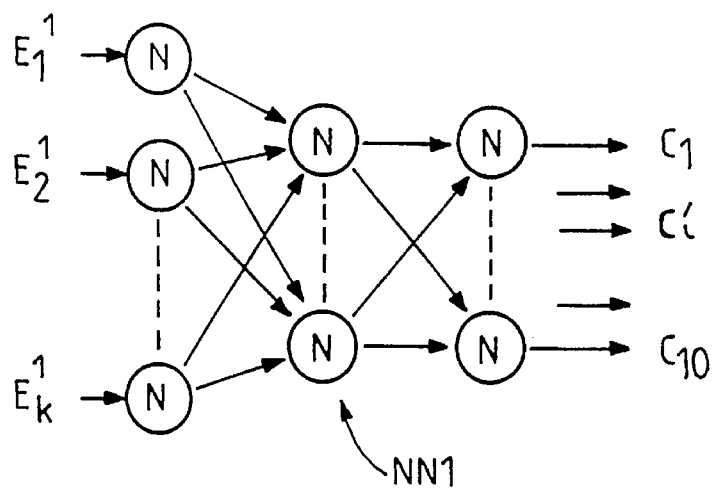
FIG. 6B which shows the first neural network.

Referring to FIG. 6B, the various neurons N and their weighted interconnections form a network. The neurons N in the input layer receive their inputs from the outside world; and the neurons of the output layer provide their outputs to the outside world. The layers present between the input layer and the output layer are called hidden layers. The threshold functions Th can have various forms and are called activation functions.

A neural network is subjected to learning. For this learning, a database is built, for which it has been determined experimentally what outputs should be obtained when certain data are presented to the inputs. During learning, the weights of the neural network are determined by repeated trials using the database, by introducing known inputs and searching for the requisite outputs. When the results are deemed satisfactory, that is to say when the neural network knows how to yield the valid outputs corresponding to certain inputs, the weights are then fixed. Henceforth, the neural network works by classification.

According to the invention, the neural network or networks used, NN1 and possibly NN2, includes or include just a single hidden layer and a small number of outputs.

Generally, the first neural network NN1 is chosen such that it has as many inputs $E_1^1$ to $E_k^1$ as characteristics $E_1$ to $E_k$ presented. For example:

$E_1^1$ to $E_k^1$=256 inputs for the k=256 characteristics $E_1$ to $E_k$ presented when the process according to the invention includes a log-polar transformation, $E_1^1$ to $E_k^1$=125 inputs for the k=125 characteristics $E_1$ to $E_k$, presented when the process includes a bank of 105 filters forming differential operators to which 20 special characteristics are added, $E_1^1$ to $E_k^1$=100 inputs for the k=100 characteristics $E_1$ to $E_k$ selected preferentially according to the invention.

This first neural network NN1 then has 10 neurons in the hidden layer, and 10 outputs which correspond to the 10 anatomical classes C1 to C10 defined in Table I.

At the output from this first neural network NN1, instead of the 64×64 sub-sampled image I(PI), formed of the selected pixels of interest PI, 10 so-called activation images I(Ci) are obtained, each representing the result of the activation function of the corresponding output of the neural network (with i=1 to 10).

Each pixel of interest PI is thus endowed with 10 probability values $Q_1, Q_2, Q_3, \ldots, Q_{10}$, each value $Q_1$ to $Q_{10}$ representing the probability that this pixel has of residing in each anatomical class Ci from C1 to C 10.

Thus, it can happen that a pixel of interest PI may have a high probability value relative to more than one class. Now, this pixel of interest can in fact reside in only a single anatomical class Ci, that is to say in a single activation image I(Ci). The other high values of probability which were allocated to it are in reality false alarms.

These false alarms must be eliminated. For this purpose, the method according to the invention includes a second phase.

II/SECOND PHASE: Elimination of false alarms.

It is recalled that the purpose of the invention is ultimately to determine the coordinates of just 3 key pixels K2, K3, K4, and to eliminate all the other pixels then denoted TT.

These three pixels will be selected respectively from each of the activation images corresponding to each of the anatomical classes:

I(C2)→apex K2

I(C3)→posterior end of the valve K3

I(C4)→anterior end of the valve K4

In each of these activation images I(C2), I(C3), I(C4) there are false alarms formed by pixels, among the pixels of interest, which also happen to have a high value of probability with respect to this same class.

The usefulness of having formed in the first phase, by means of the first neural network NN1, not just 3 activation images but 10 activation images corresponding to the various anatomical regions of the left ventricle plus the region of the outside pixels, is that it will now be possible to use this information to impose consistency conditions on the information relating to these three images in respect of information from the other activation images, all of which are probability images.

For example, a high probability of a pixel of interest PI belonging to the class of the apex must be consistent with a high probability of the anatomical region situated to the north-west being an internal region and with a high probability of the anatomical region situated to the south being the background consisting of external pixels.

Each of the pixels of the other two key classes must also be associated with probability conditions relating to their neighborhood in a certain direction in respect of the 10 anatomical regions. These neighborhood conditions will thus make it possible to eliminate false alarms.

For example, 1 pixel from the anterior valve class that does not have the aorta class on its left and an internal region to the south is a false alarm with respect to this anterior valve class.

IIa) FIRST STEP: Generation of a vector of 1 characteristics $E'_1$, to $E'_1$, for each pixel of interest PI and in each activation image I(Ci).

In this step 6 characteristics are generated per pixel of interest PI of each of the 10 activation images I(Ci), i.e. in all a number l=60 characteristics denoted $E'_1$, to $E'_1$ for locating, in x and y, a pixel of interest PI in the 512×512 image.

These 6 characteristics per images I(Ci) are generated by differential operators embodied by so many SOBEL filters, successively to order 0, to order 1 and to order 2.

In this step there is therefore an attempt to discover the behavior of the activation image to a scale of some ten pixels around the current pixel. Thus, the current pixel and a low-pass neighborhood of about 10 pixels is looked at.

A bank of six filters is therefore passed over each activation image, these characterizing in each pixel of interest the probability that this pixel belongs to a class as a function of its position relative to its neighborhood. Typically, a high compression of information is thus obtained since, in the example chosen in each pixel only six data items or values will be determined. These six values are obtained through the derivatives calculated by the filters, namely:

to order 0: the smoothed low-pass value of the probability (1 value), to order 1: the gradient in the x direction and the gradient in the y direction (2 values), to order 2: the second derivative in the x direction and the second derivative in the y direction and the mixed derivative in x and y (3 values).

These characteristics describe for example that the probability of a pixel belonging to a given class is large when the gradient varies in such a way in the x direction, in such a way in the y direction, when the mean value has a certain level in a given neighborhood, etc. These six values characterize the way in which the probability varies in space.

IIb) SECOND STEP: Use of a second neural network.

Figure 6C:
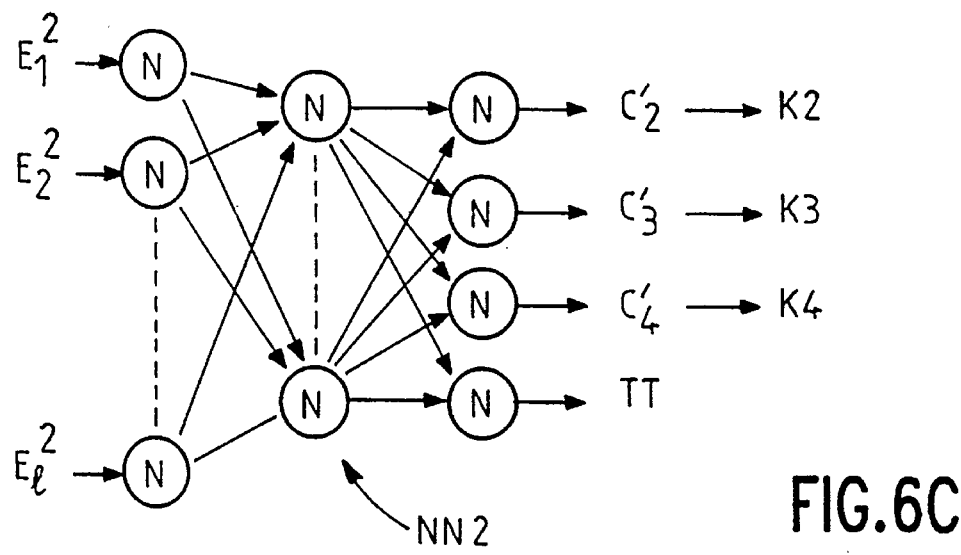
FIG. 6C which shows the second neural network.

Referring to FIG. 6C, a second neural network denoted NN2 receives as input these six values for each pixel of interest of each of the 10 probability classes. This second neural network therefore receives in all as input 60 values per pixel of interest constituting an input vector of l=60 characteristics. In this way, this network is informed of the way in which the various probabilities vary in the space around the current pixel of interest. This second neural network NN2 is under these conditions capable of rejecting the false alarms. Indeed, when the intensities of the pixels vary in a manner consistent with a specified class, it is this class which is favored. Contrastingly, when the intensity of the pixels varies in a manner inconsistent with a specified class, this class is disfavored.

This second neural network therefore includes as output a number q=4 classes:

the apex class=C'2 the anterior valve class=C'3 the posterior valve class=C'4 the class of all the other pixels=TT.

Next, out of all the pixels selected as output from the second neural network NN2, in one of the three classes of interest C'2, C'3, C'4 or classes of the three key pixels, a decision still has to be made in order definitively to select a single pixel per class.

A first solution consists in selecting the pixel which exhibits the highest probability value in its class.

Another solution consists in constructing a cost function using both the information relating to the probability values and additional consistency information. Within this additional information it is possible to bear in mind that the three sought-after key pixels K2, K3, K4 form an isosceles triangle whose base is the distance apart of the two valve end pixels K3, K4 and whose vertex is the apex K2.

III/VARIANT OF THE SECOND PHASE.

In a variant of the invention the last solution employing a cost function can be applied immediately after output from the first neural network NN1.

For this purpose, the information from each of the three images, with probability I(C2), I(C3), I(C4) corresponding to the key pixels K2, K3, K4 is combined with the information from the image of the curves of equal level and from the gradient curves.

IIIa) FIRST STEP: Reduction in the number of pixels in the classes of key pixels.

Only the three probability classes I(C2), I(C3), I(C4) are considered.

It is again important to reduce the number of pixels to be processed compares with the number of pixels contained in each of these probability images.

Figure 7A:
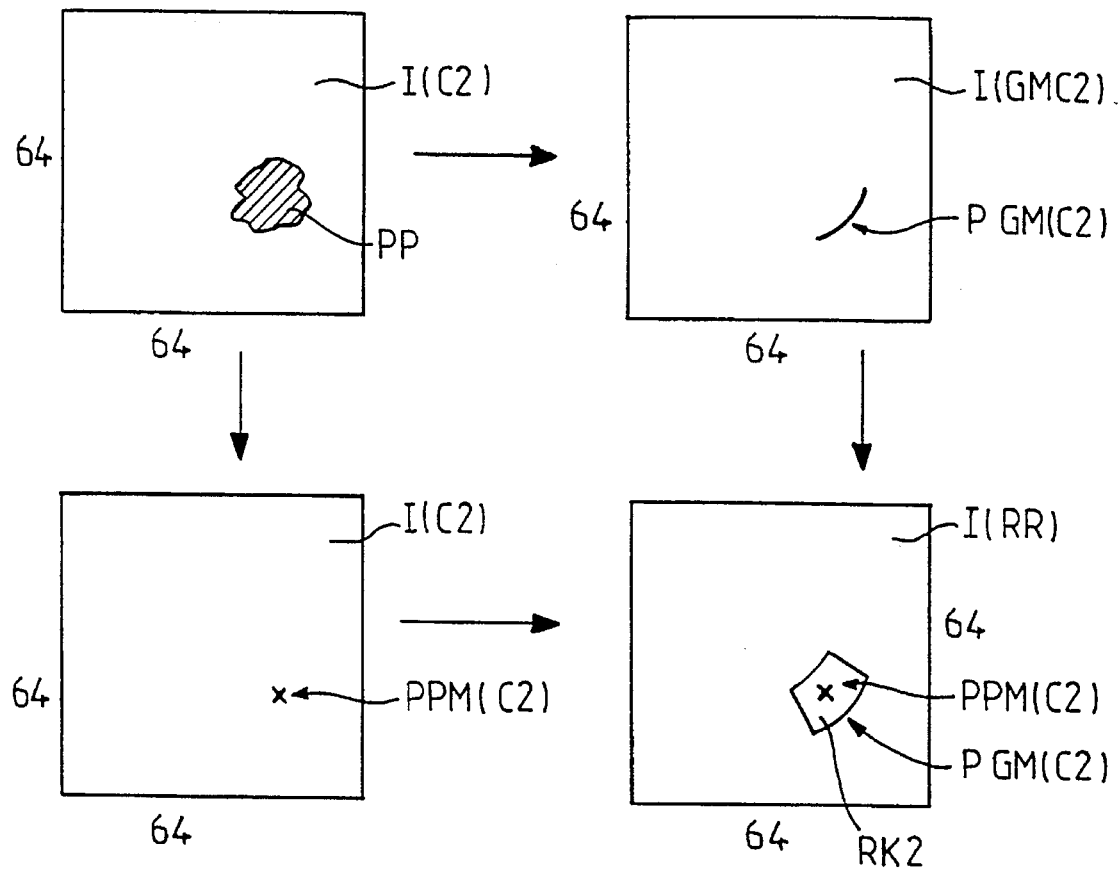
FIG. 7A which illustrates the steps of delimiting a reduced search region, in the classes of key pixels, so as to succeed in setting up a cost function.

For this purpose, referring to FIG. 7A, a new image, I(GMC2), I(GMC3), I(GMC4) respectively, of the gradients with elimination of the non-maximal gradients is constructed from each probability image. This construction is performed by the procedure already described earlier in the first phase of the method according to the invention and which was then applied to the original image. Each of these newly constructed images contains only pieces of curves formed by pixels, PGM(C2), PGM(C3), PGM(C4), having maximal gradients and hence situated on contours.

The problem is that it has been found that, in most cases, the true key pixels are:

neither exactly on these PGM contours, nor exactly the PPM pixel having the highest probability value in the relevant class.

Under these conditions, in each class C2, C3, C4:

on the basis of the position of the pixel PPM(Ci) (with i=2, 3 or 4) having the maximum probability in the given class, we select:

the contour segment closest to this pixel PPM(Ci). For example the contour segment situated not more than 2 to 5 pixels from this maximum probability pixel PPM(Ci) is selected, then all the pixels are selected in a small region RKi having the PPM(Ci) as center and as one of its edges the contour segment known by virtue of the new image of maximum gradients I(GMCi) (with i=2, 3 or 4).

Small regions RK2, RK3, RK4, centered about a pixel of maximum probability, have then been delimited in each image I(C2), I(C3), (IC4), with an area partially delimited by pixels of maximum gradients. These small regions contain few pixels. These pixels are denoted PK2, PK3, PK4 respectively, and experience has shown that the true key pixels actually lie within these regions referenced in a new image I(RR).

IIIb) SECOND STEP: Implementation of a cost function.

In this step, it remains actually to determine the three key pixels K2, K3, K4.

For this purpose, the 3 key pixels can be determined directly concurrently. Or else the two valve end pixels K3, K4 can be determined first and, based on these two robustly determined pixels, the position of the apex K2 can be determined next.

If the second solution is chosen, by way of example, the coordinates of the valve end pixels K3, K4 are therefore calculated first.

Figure 7B:
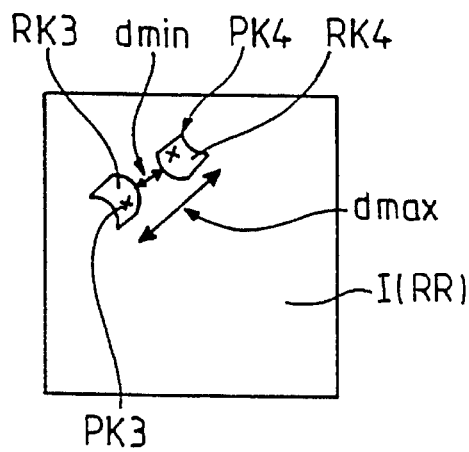
FIG. 7B illustrates the detecting of the valve end key pixels in the reduced regions of search of the valve end classes.

Referring to FIG. 7B, for this purpose, we evaluate:

the smallest distance dmin between the pixels of the two regions RK3 and RK4 which contain the pixels selected for the search for the valve ends K3, K4, the largest distance dmax between the pixels of these two regions RK4, the distance between the candidate pixels d(PK3, PK4) of these two regions.

Next, a cost function is calculated using logarithmic coding tables (or LUT.log) and the maximum of this function is sought, this being writable simply as:

$$LUT.\log[PK3] + LUT.\log[PK4] + LUT.\log\left[\frac{d^2(PK4,PK3)}{d^2\max - d^2\min}\right]$$

Figure 7C:
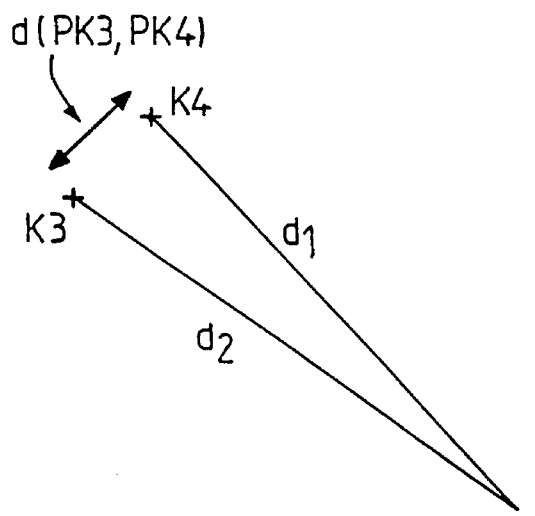
FIG. 7C illustrates the isoscelesness condition which links the 3 key pixels and shows the resulting Conditions of distance between pixels.

Referring to FIG. 7C, on completion of this search for a maximum LUT.log function, it remains to determine the location of the apex. This is done by regarding the two pixels K3, K4 as forming the base of an isosceles triangle, of which the apex K2 is the vertex.

The location of the apex K2 is then obtained by calculating a simple ratio which provides the uncertainty in the isoscelesness as obtained with an apex candidate pixel PK2, when the valve end pixels are fixed K3, K4.

Let d1 be the distance between the candidate apex pixel and K3, d2 the distance between the candidate apex pixel and K4.

The best candidate apex pixel is that for which the ratio between the minimum of d1, d2 and the maximum of d1, d2 (or these values squared) is as close as possible to 1.

DEVICE

A device is proposed below for implementing the method described above. This device can be applied to the implementation of this method when studying other than cardiographic images.

In the account below, the elements of this device are described in the application to the processing of cardiographic images by way of non-limiting example.

Figure 8:
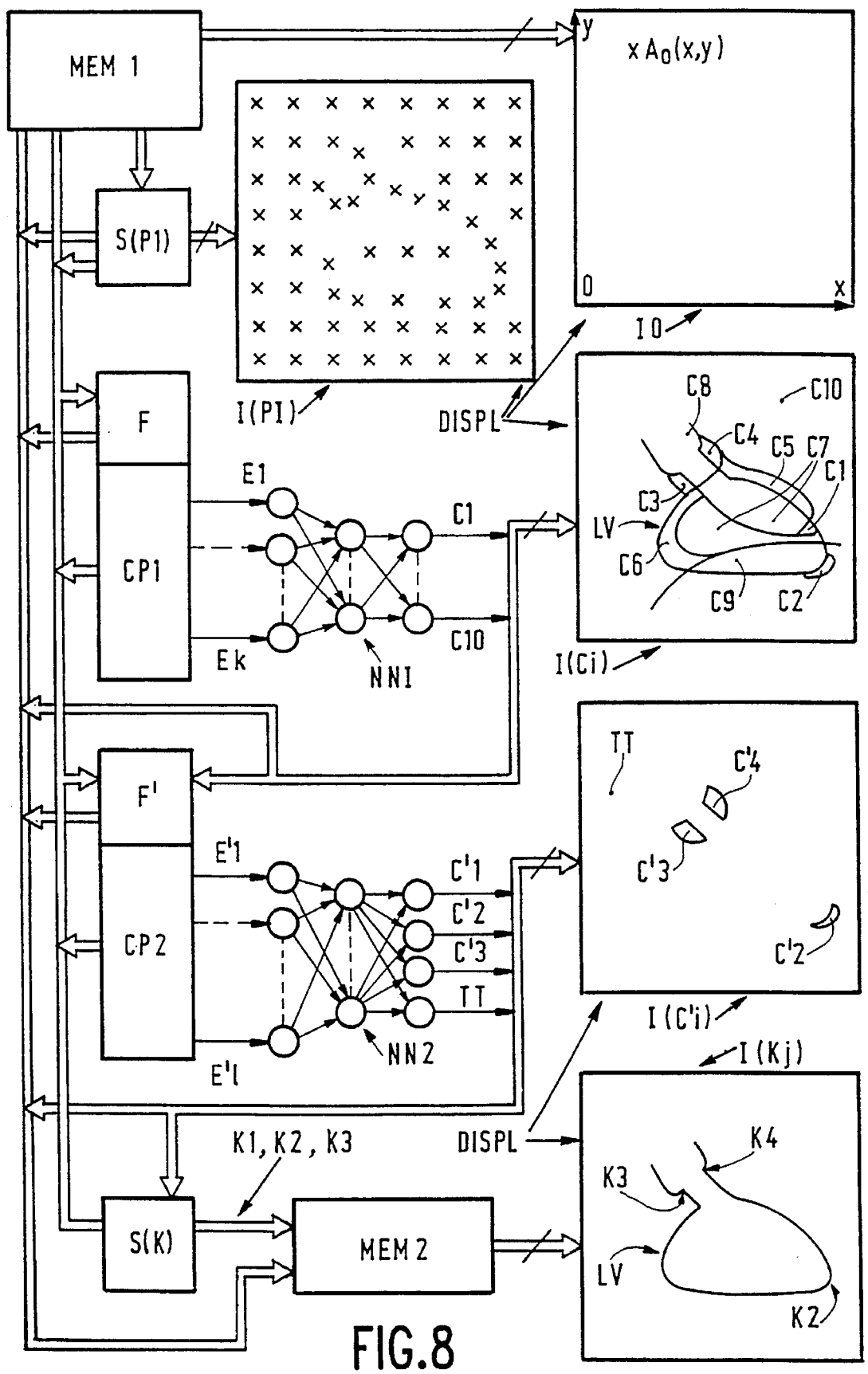
FIG. 8 illustrates schematically in a block diagram a device for implementing the method.

Referring to FIG. 8, a device for processing images in order automatically to detect key pixels $K_2$, $K_3$, $K_4$ of the contour of an object such as the left ventricle LV in an image essentially comprises:

a first memory MEM1 which stores, in a digitized initial image $I_0$ containing this object as described above while referring to FIG. 1B, the intensity values of each current pixel $A_0$ labelled by its coordinates x, y; this first memory MEM1 also stores data relating to classes C1 to C10 formed by anatomical regions of the object LV, and described earlier while referring to FIG. 1A; of these classes, three classes referred to as corresponding classes $C_2$, $C_3$, $C_4$ surround the pixels to be detected $K_2$, $K_3$, $K_4$, respectively;

means of selection S(PI) which select from the initial image $I_0$, pixels referred to as pixels of interest PI situated on the contour of the left ventricle LV in the image $I_0$, and inside and outside this object;

first means of calculation CP1 which generate a first vector of characteristics $E_1$ to $E_k$, for each pixel of interest PI; these characteristics comprise local information and global information drawn from around the relevant pixel of interest PI;

a first neural network NN1 as described while referring to FIG. 6B which receives at its inputs a vector of characteristics for each relevant pixel of interest and which determines the probability that each pixel of interest PI has of belonging to the various classes $C_1$ to $C_{10}$; the outputs from this first neural network make it possible to construct 10 probability images I($C_1$ to I($C_{10}$) containing the pixels PI selected as having the highest probability of belonging to each class; represented in FIG. 8 for simplicity in the drawing, is an image which brings together all the classes $C_1$ to $C_{10}$.

As represented in FIG. 8, this device moreover comprises:

second means of calculation CP2 which generate a second vector of characteristics $E'_1$ to $E'_1$ relating to the pixels of interest PI;

a second neural network NN2, as described while referring to FIG. 6C, which receives at its inputs the second vector of characteristics $E'_1$ to $E'_1$ and which determines the probability which the pixels of interest PI have of belonging to the 3 classes $C_2$, $C_3$, $C_4$ corresponding respectively to the key pixels $K_2$, $K_3$, $K_4$, or else to the remainder of the image TT;

means of selection S(K) which select, as key pixels $K_2$, $K_3$, $K_4$, those pixels of classes $C_2$, $C_3$, $C_4$ which exhibited the highest probability of belonging to these classes; these means of selection S(K) also take into account for this selection, geometrical hypotheses as described earlier when referring to FIGS. 7.

Referring to FIG. 8, this device can moreover comprise a second memory MEM2 for storing the data of the various images formed by the various means of the device, as well as display means DISPL having access to MEM1 or to MEM2; for reasons of simplicity of the drawing, not all of the access points between the various means, the memories MEM1, MEM2 and DISPL have been represented; these connections between these elements are straightforward and represent merely a routine task within the scope of those skilled in the art.

As described earlier while referring to FIG. 3A to 3E, the means of selection S(PI) of pixels of interest PI include:

gradient filters applied to the initial image $I_0$ in order to select pixels having a gradient of maximum intensity P(GM) which are situated on the contour of the object LV and to eliminate the other pixels;

the means of selection S(PI) also include means of calculation for sampling the initial image $I_0$ at a lower frequency while preferentially preserving the pixels P(GM) having a gradient of maximum intensity.

Referring to FIG. 8, this device comprises means of calculation F for providing local and global image-data around each pixel of interest PI.

In one embodiment, these means of calculation F include:

Gaussian function kernel multiresolution type filters applied to the initial image $I_0$ and means of calculation for sub-sampling the filtered images in order to form a pyramid of Gaussian images $I_1$ to $I_7$, as described earlier while referring to FIG. 4A to 4C, means of calculating a log-polar transformation function applied to the pixels of interest PI in accordance with a chart formed of circular sectors, as described earlier while referring to FIG. 5A and 5B.

In this embodiment the first means of calculation CP1 estimate each characteristic $E_1$ to $E_k$ of the said first vector of characteristics, as a mean of the intensities of the pixels in each circular sector of the chart relating to the log-polar transformation, by interpolation of the intensity of four neighboring pixels selected from one of the images of the pyramid of Gaussian images, which coincide with the four corner pixels delimiting the said relevant circular sector, while taking account of the distance apart of these pixels, due to the frequency of sampling of the Gaussian image used.

In another embodiment the means of calculation F include:

means of calculating the intensity of each pixel of interest PI identified in each image $I_0$ to $I_7$ of the pyramid of Gaussian images, recursive filters orientable about each pixel of interest PI, for calculating, in each image $I_0$ to $I_7$ of the pyramid of Gaussian images, a series expansion whose terms consist of the partial derivatives, from an order 0 to an order n, of the convolution function of the Gaussian function relating to the said image, with the intensity of the relevant pixel of interest PI.

In this latter embodiment, the first means of calculation CP1 generate the said first vector of characteristics relating to each pixel of interest PI by estimating each characteristic $E_1$ to $E_k$ as one of the terms of the series expansions calculated for the images of the pyramid of Gaussian images.

Referring to FIG. 8, this device moreover comprises:

second means of calculation CP2 for generating a second vector of characteristics $E'_1$ to $E'_1$ relating to the pixels of interest;

a second neural network NN2 as described above while referring to FIG. 6E, for receiving at its inputs the second vector of characteristics and for classifying the pixels of interest PI into corresponding classes $C_2$, $C_3$, $C_4$ and a class of the other pixels, and means of selection S(K) of each of the key pixels $K_2$, $K_3$, $K_4$ from among the pixels of interest PI of the corresponding class $C_2$, $C_3$, $C_4$.

This device moreover comprises means of calculation F' for providing local image dam around each pixel of interest PI, drawn from images referred to as probability images $I(C_1$ to $I(C_{10})$ consisting of the pixels of interest in the said classes $C_1$ to $C_{10}$ provided by the first neural network NN1, including:

means of calculating the intensity of each pixel identified in each probability image, recursive filters orientable about each pixel of interest PI for calculating in each probability image, partial derivatives from an order 0 to an order p, as already described while referring to FIG. 7A.

These filters provide special data relating to the neighborhood of each pixel of interest, and in particular the possible presence of certain classes around the relevant pixel.

In this embodiment the second means of calculation CP2 estimate each characteristic $E'_1$ to $E'_1$ of the second vector of characteristics as those applied in each pixel of interest which code the probabilities of the presence of certain of the said classes $C_1$ to $C_m$ around the pixels of interest PI, and the means of selection S(K) of the key pixels $K_2$, $K_3$, $K_4$ retain the pixels which fulfil a condition consisting in the highest probability of belonging respectively to the corresponding class $C_1$, $C_2$, $C_3$, and possibly especially as described above while referring to FIG. 7B and 7C, those which alto fulfil a geometrical condition according to which the ends of the aortic valve $K_3$, $K_4$ form the base of an isosceles triangle of which the apex $K_2$ is the vertex.

We claim:

1. Method of processing images in order automatically to detect points situated on the contour of an object (LV) at predetermined structure, referred to as key pixels ($K_2$, $K_3$, $K_4$), in an image referred to as the initial image ($I_0$), this method comprising a first phase including steps of:

storage in the initial image ($I_0$) in the form of a two-dimensional matrix of pixels of the intensity values of each pixel ($A_0$) labelled by its coordinates (x,y);

storage in the initial image ($I_0$) of data of regions of the object (LV) which are referred to as classes ($C_1$ to $C_m$) including classes which are referred to as corresponding classes ($C_2$, $C_3$, $C_4$) respectively containing the key pixels ($K_2$, $K_3$, $K_4$) to be detected;

selection of pixels of the initial image ($I_0$) which are referred to as pixels of interest (PI), on the contour of and inside and outside the object (LV);

generation of a first vector of characteristics ($E_1$ to $E_k$) for each of the pixels of interest (PI); and classification of the pixels of interest (PI) into the said classes ($C_1$ to $C_m$) of the object (LV) on the basis of their respective vector of characteristics ($E_1$ to $E_k$).

2. Method of processing images in order automatically to detect points situated on the contour of an object (LV), referred to as key pixels ($K_2$, $K_3$, $K_4$), in an image referred to as the initial image ($I_0$), this method comprising a first phase including steps of:

storage in the initial image ($I_0$) in the form of a two-dimensional matrix of matrix of pixels of the intensity values of each pixel ($A_0$) labelled by its coordinates (x, y);

storage in the initial image ($I_0$) of data of regions of the object (LV) which referred to as classes ($C_1$ to $C_m$) including classes which are referred to as corresponding classes ($C_2$, $C_3$, $C_4$) respectively containing the key pixels ($K_2$, $K_3$, $K_4$) to be detected;

selection of pixels of the initial image ($I_0$) which are referred to as pixels of interest (PI), on the contour of and inside and outside the object (LV);

generation of a first vector of characteristics ($E_1$ to $E_k$) for each of the pixels of interest (PI); and classification of the pixels of interest (PI) into the said classes ($C_1$ to $C_m$) of the object (LV) on the basis of their respective vector of characteristics ($E_1$ to $E_k$);

wherein the step of selection of the pixels of interest (PI), sub-steps of:

filtering of the initial image ($I_0$) in order to select pixels having a gradient of maximum intensity which are situated on the contour of the object (LV); and sampling of the initial image ($I_0$) at a lower frequency, preferentially preserving the pixels having a gradient of maximum intensity.

3. Method according to claim 2 furthermore comprising, in the first phase, steps of:

multiresolution filtering of the initial image ($I_0$), by Gaussian functions, and sub-sampling of the filtered images in order to form a pyramid of Gaussian images ($I_0$ to $I_7$);

generation of said first vector of characteristics relating to each pixel of interest (PI) from the image data of this pyramid of Gaussian images.

4. Method according to claim 3, comprising steps of:

log-polar transformation applied to the pixels of interest (PI) in accordance with a chart formed of circular sectors;

generation of said first vector of characteristics by estimating each characteristic ($E_1$ to $E_k$) as a mean of the intensities of the pixels in each circular sector of the chart relating to the log-polar transformation, calculated by interpolation of the intensity of four neighboring pixels selected from one of the images of the pyramid of Gaussian images, which coincide with the four corner pixels delimiting said relevant circular sector, while taking account of the distance apart of these pixels, due to the frequency of sampling of the Gaussian image used.

5. Method according to claim 4, comprising a step of:

generation of said first vector of characteristics, with the addition, to the characteristics already calculated, of special characteristics, including the modulus of the gradient of the pixels of interest, the direction in which this gradient is a maximum, and the curvature of the lines of equal grey level.

6. Method according to claim 3, comprising steps of:

calculation of the intensity of each pixel of interest (PI) identified in each image ($I_0$ to $I_7$) of the pyramid of Gaussian images;

orientable recursive filterings in each image ($I_0$ to $I_7$) of the pyramid of Gaussian images about each pixel of interest (PI), in order to calculate a bounded series expansion whose terms consist of the partial derivatives, from an order 0 to an order n, of the convolution function of the Gaussian function relating to said image, with the intensity of the relevant pixel of interest (PI);

generation of said first vector of characteristics relating to each pixel of interest (PI) by estimating each characteristic ($E_1$ to $E_k$) as one of the terms of the series expansions calculated for the images of the pyramid of Gaussian images.

7. Method according to claim 6, comprising a step of:

generation of said first vector of characteristics, with the addition, to the characteristics already calculated, of special characteristics, including the modulus of the gradient of the pixels of interest, the direction in which this gradient is a maximum, and the curvature of the lines of equal grey level.

8. Method of processing images in order automatically to detect points situated on the contour of an object (LV), referred to as key pixels ($K_2$, $K_3$, $K_4$), in an image referred to as the initial image ($I_0$), this method comprising a first phase including steps of:

storage in the initial image ($I_0$) in the form of a two-dimensional matrix of pixels of the intensity values of each pixel ($A_0$) labelled by its coordinates (x, y);

storage in the initial image ($I_0$) of data of regions of the object (LV) which are referred to as classes ($C_1$ to $C_m$) including classes which are referred to as corresponding classes ($C_2$, $C_3$, $C_4$) respectively containing; the key pixels ($K_2$, $K_3$, $K_4$) to be detected;

selection of pixels of the initial image ($I_0$) which are referred to as pixels of interest (PI), on the contour of and inside and outside the object (LV);

generation of a first vector of characteristics ($E_1$ to $E_k$) for each of the pixels of interest (PI); and classification of the pixels of interest (PI) into the said classes ($C_1$ to $C_m$) of the object (LV) on the basis of their respective vector of characteristics ($E_1$ to $E_k$); and furthermore comprising a second phase including a step of selection of each of the key pixels ($K_2$, $K_3$, $K_4$) from the pixels of interest (PI) of the corresponding class ($C_2$, $C_3$, $C_4$).

9. Method according to claim 8 comprising, in the second phase, steps of:

generation of a second vector of characteristics ($E'_1$ to $E'_1$) relating to the pixels of interest, these characteristics coding the probabilities of presence of certain of said classes ($C_1$ to $C_m$) around the pixels of interest (PI);

classification of the pixels of interest (PI) into corresponding classes ($C_2$, $C_3$, $C_4$) and a class of the other pixels.

10. Method according to claim 9 comprising a step of:

selection of the key pixels ($K_2$, $K_3$, $K_4$) as those which fulfil a first condition consisting in the highest probability of belonging respectively to the corresponding class ($C_1$, $C_2$, $C_3$).

11. Method according to claim 10, in which the image to be processed is a cardiographic image where the object is the left ventricle (LV), and where the key pixels to be detected are the apex ($K_2$) and the two ends ($K_3$, $K_4$) of the aortic valve, this method comprising in the second phase a step of:

selection of the key pixels ($K_2$, $K_3$, $K_4$) as those which also fulfil a second geometrical condition according to which the ends of the aortic valve ($K_3$, $K_4$) form the base of an isosceles triangle of which the apex ($K_2$) is the vertex.

12. Device for processing images in order automatically to detect points situated on the contour of an object (LV), referred to as key pixels ($K_2$, $K_3$, $K_4$) in an image referred to as the initial image ($I_0$), this device comprising:

first storage means (MEM1) for storing, in the initial image ($I_0$) in the form of a two-dimensional matrix of pixels, the intensity values of each pixel ($A_0$) labelled by its coordinates (x, y), and data of regions of the object (LV), which are referred to as classes ($C_1$ to $C_m$), including classes referred to as corresponding classes ($C_2$, $C_3$, $C_4$) respectively containing the key pixels ($K_2$, $K_3$, $K_4$) to be detected;

means of selection of pixels of the initial image ($I_0$), referred to as pixels of interest (PI), on the contour of and inside and outside the object (LV);

first means of calculation (CP1), for generating a first vector of characteristics ($E_1$ to $E_k$) for each of the pixels of interest (PI);

a first neural network (NN1) for receiving at its inputs the first vector of characteristics and for performing a classification of the pixels of interest (PI) into said classes ($C_1$ to $C_M$) of the object (LV) on the basis of their respective vector of characteristics ($E_1$ to $E_k$).

13. Device according to claim 12 comprising second storage means (MEM2) and display means (DISPL) for respectively storing and displaying data formed by intensities of pixels labelled by their coordinates (x, y) in images in the form of a two-dimensional matrix of pixels.

14. Device for processing images according to claim 12 moreover comprising:

means of selection of each of the key pixels ($K_2$, $K_3$, $K_4$) from the pixels of interest (PI) of the corresponding class ($C_2$, $C_3$, $C_4$).

15. Device according to claim 14, comprising:

second means of calculation (CP2) for generating a second vector of characteristics ($E'_1$ to $E'_1$) relating to the pixels of interest;

a second neural network (NN2) for receiving at its inputs the second vector of characteristics and for classifying the pixels of interest (PI) into corresponding classes ($C_2$, $C_3$, $C_4$) and a class of the other pixels.

16. Device according to claim 15, moreover comprising:

means (F') for providing local image-data around each pixel of interest (PI) and drawn from images retorted to as probability images consisting of pixels of interest in said classes ($C_1$ to $C_{10}$) provided by the first neural network (NN1), means of calculating the intensity of each pixel identified in each probability image, recursive filters orientable about each pixel of interest (PI) for calculating in each probability image partial derivatives from an order 0 to an order p, in which device:

the second means of calculation (CP2) estimate each characteristic ($E'_1$ to $E'_1$) of the second vector of characteristics as those applied at each pixel of interest which code the probability of presence of certain of said classes ($C_1$ to $C_m$) around the pixels of interest (PI), and the means of selection of the key pixels ($K_2$, $K_3$, $K_4$) retain the pixels which fulfil a condition consisting in the highest probability of belonging respectively to the corresponding class ($C_1$, $C_2$, $C_3$).

17. Device according to claim 16, for processing a cardiographic image where the object is the left ventricle (LV), where the key pixels to be detected are the apex ($K_2$) and the two ends ($K_3$, $K_4$) of the aortic valve, in which device:

the means of selection of the key pixels ($K_2$, $K_3$, $K_4$) retain those which also fulfil a geometrical condition according to which the ends of the aortic valve ($K_3$, $K_4$) form the base of an isosceles triangle of which the apex ($K_2$) is the vertex.

18. Device according to claim 12, in which the means of selection of the pixels of interest (PI) include:

gradient filters applied to the initial image ($I_0$) in order to select pixels having a gradient of maximum intensity which are situated on the contour of the object (LV) and to eliminate the other pixels;

means of calculation for sampling the initial image ($I_0$) at a lower frequency, preferentially preserving the pixels having a gradient of maximum intensity.

19. Device according to claim 18 moreover comprising:

means (F) for providing local and global image-data drawn from the initial image ($I_0$) around each pixel of interest (PI) including Gaussian function kernel multi-resolution type filters applied to the initial image ($I_0$) and means of calculation for sub-sampling the filtered images to form a pyramid of Gaussian images ($I_1$ to $I_7$);

in which device:

the first means of calculation (CP1) generate said first vector of characteristics relating to each pixel of interest (PI on the basis of the image data of this pyramid of Gaussian images.

20. Device according to claim 19, in which:

the means (F) for providing local and global image-data include means for calculating a log-polar transformation function applied to the pixels of interest (PI) according to a chart formed of circular sectors;

and the first means of calculation (CP1) estimate each characteristic ($E_1$ to $E_k$) of said first vector of characteristics, as a mean of the intensities of the pixels in each circular sector of the chart relating to the log-polar transformation, by interpolation of the intensity of four neighboring pixels selected from one of the images of the pyramid of Gaussian images, which coincide with the four corner pixels delimiting said relevant circular sector, while taking account of the distance apart of these pixels, due to the frequency of sampling of the Gaussian image used.

21. Device according to claim 19, in which:

the means of calculating the intensity of each pixel of interest (PI) identified in each image ($I_0$ to $I_7$) of the pyramid of Gaussian images, and recursive filters orientable about each pixel of interest (PI), for calculating, in each image ($I_0$ to $I_7$) of the pyramid of Gaussian images, a series expansion whose terms consist of the partial derivatives, from an order 0 to an order n, of the convolution function of the Gaussian function relating to said image, with the intensity of the relevant pixel of interest (PI), and the first means of calculation (CP1) generate said first vector of characteristics relating to each pixel of interest (PI) by estimating each characteristic ($E_1$ to $E_k$) as one of the terms of the series expansions calculated for the images of the pyramid of Gaussian images.

22. Device according to claim 20, in which:

the first means of calculation (CP1) for generating said vector of characteristics comprise means for adding, to the characteristics already calculated, special characteristics, including the modulus of the gradient of the pixels of interest, the direction in which this gradient is a maximum, and the curvature of the lines of equal grey level.

* * * * *